United States Patent [19]  [11] 4,417,939
McAdams  [45] Nov. 29, 1983

[54] SYSTEM FOR PRODUCING A BITUMEN LAMINATE

[75] Inventor: Ronald R. McAdams, North Bend, Ohio

[73] Assignee: McAdams Manufacturing Co., Inc., Cincinnati, Ohio

[21] Appl. No.: 353,950

[22] Filed: Mar. 2, 1982

[51] Int. Cl.³ .................... B32B 31/06; B32B 31/12
[52] U.S. Cl. ............................ 156/282; 156/311; 156/324; 156/337; 156/498; 156/547; 156/550; 427/398.2; 428/489
[58] Field of Search ............... 156/282, 311, 324, 337, 156/498, 547, 550, 574, 577; 427/398.2; 428/489

[56] References Cited

U.S. PATENT DOCUMENTS

| | | |
|---|---|---|
| 1,961,077 | 5/1934 | Pater . |
| 2,016,404 | 10/1935 | Warner . |
| 2,100,387 | 11/1937 | Ferguson . |
| 2,162,687 | 6/1939 | Fischer . |
| 2,688,580 | 9/1954 | Fingerhut . |
| 2,771,745 | 11/1956 | Bramble . |
| 2,893,907 | 7/1959 | Bove . |
| 3,474,625 | 10/1969 | Draper et al. . |
| 3,522,132 | 7/1970 | Cardis .......................... 156/577 X |
| 3,581,631 | 6/1971 | Rozendaal et al. . |
| 3,698,980 | 10/1972 | Addison, Jr. ..................... 156/282 |
| 3,853,682 | 12/1974 | Hurst ............................ 156/337 X |
| 3,950,207 | 4/1976 | de Zuloaga Amat .......... 156/337 X |
| 3,967,032 | 6/1976 | Plotz et al. ..................... 428/300 |
| 4,018,730 | 4/1977 | McDonald ..................... 404/75 X |
| 4,091,135 | 5/1978 | Tajima et al. ................... 428/40 |
| 4,125,663 | 11/1978 | Eckardt .......................... 428/480 X |
| 4,215,160 | 7/1980 | Rosenberg et al. .......... 427/398.2 X |
| 4,251,586 | 2/1981 | Marzocchi ..................... 428/220 |

Primary Examiner—Robert A. Dawson
Attorney, Agent, or Firm—Wood, Herron & Evans

[57] ABSTRACT

A system for producing a relatively thin bitumen laminate comprised of an bitumen mastic core to which is adhered a fabric web on each side thereof, adherence being established simply by contacting the fabric web with the bitumen mastic while it is hot. The method includes continuous deposit at a fixed location of hot bitumen mastic to form the core on a moving lower fabric web, the laminated lower fabric web being in direct contact with a fluid cooled endless belt to prevent degradation of the fabric. The bitumen mastic is deposited on the lower web as it traverses the endless belt's upstream end roll, thereby insuring a firm, nonflexible surface upon which the mastic core can be sized by a doctor roll on the lower web. A moving top fabric web is laminated to the sized bitumen mastic core on the lower web at a location that is variable relative to the fixed location at which the mastic is deposited on the lower web. This variability of the upper fabric web's lamination point with the bitumen mastic core and lower web allows the system to be easily and simply modified for use with various synthetic fabrics, as well as with various thickness bitumen mastic cores, simply by adjusting the upper web's lamination point to that location which does not cause degradation of the upper fabric web due to the temperature of the mastic core.

15 Claims, 6 Drawing Figures

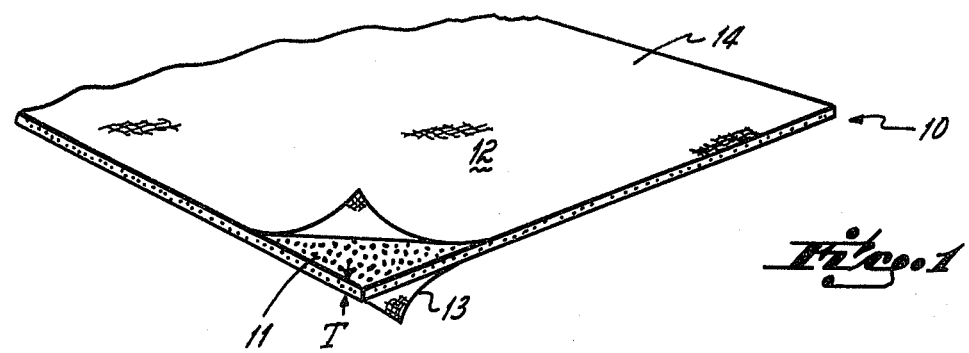
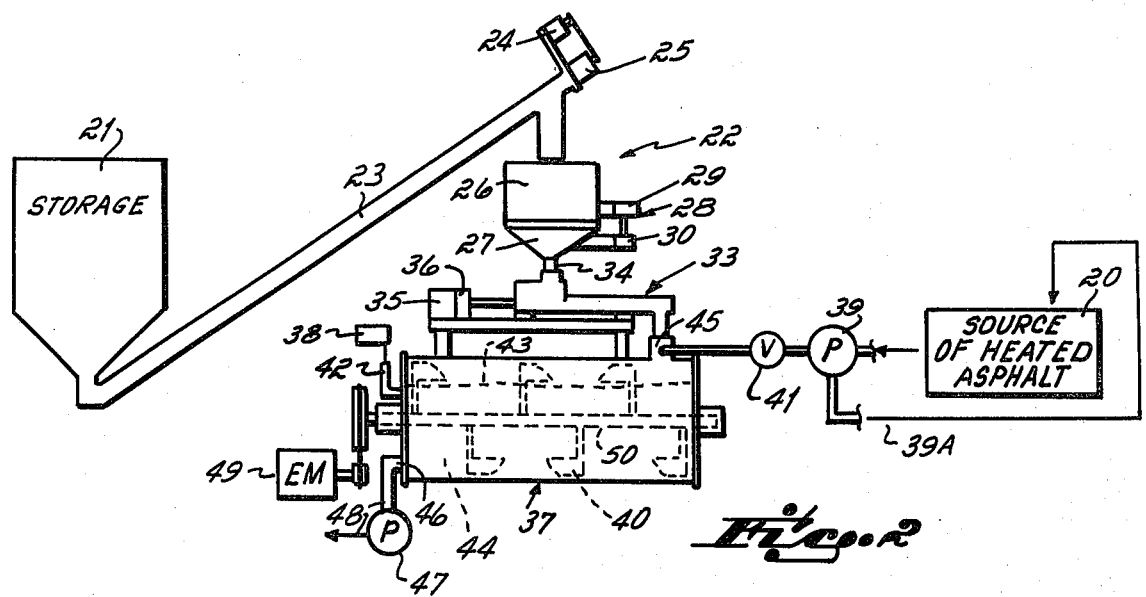
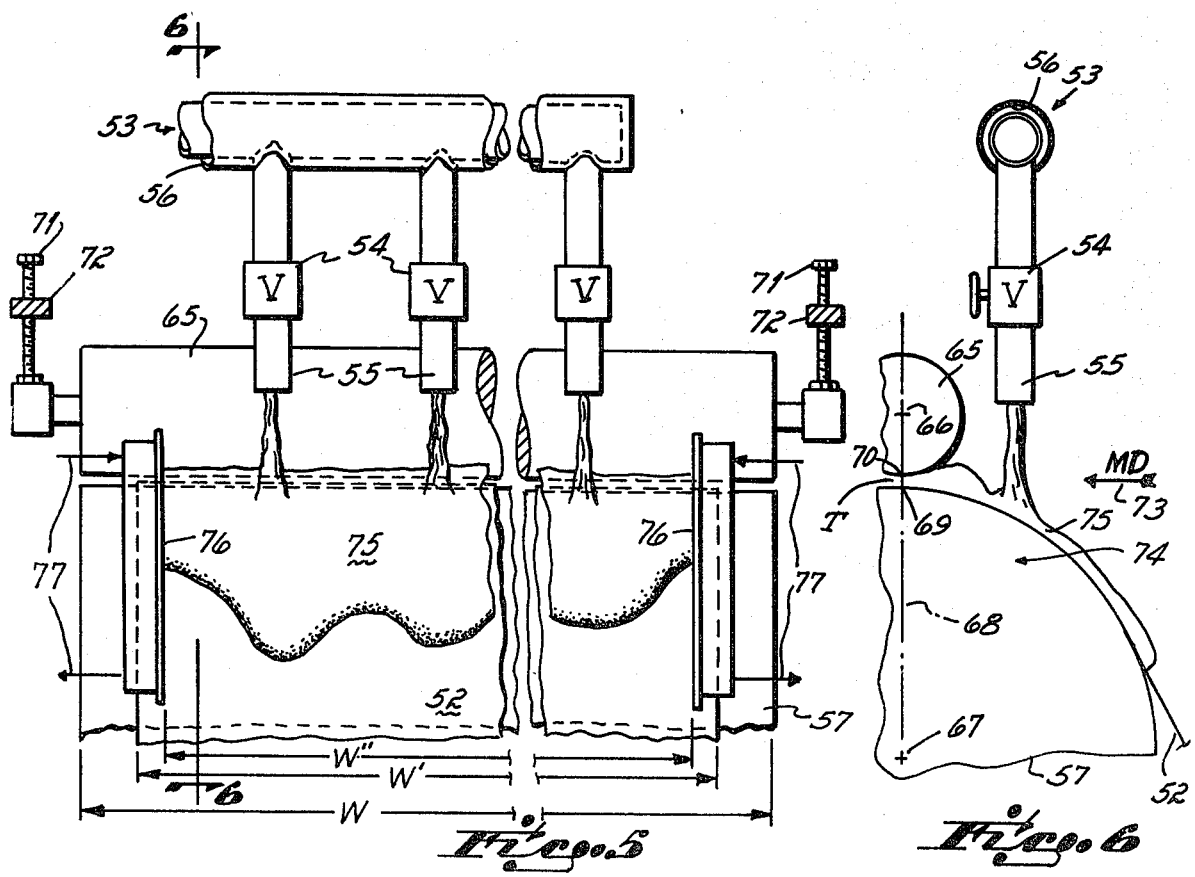

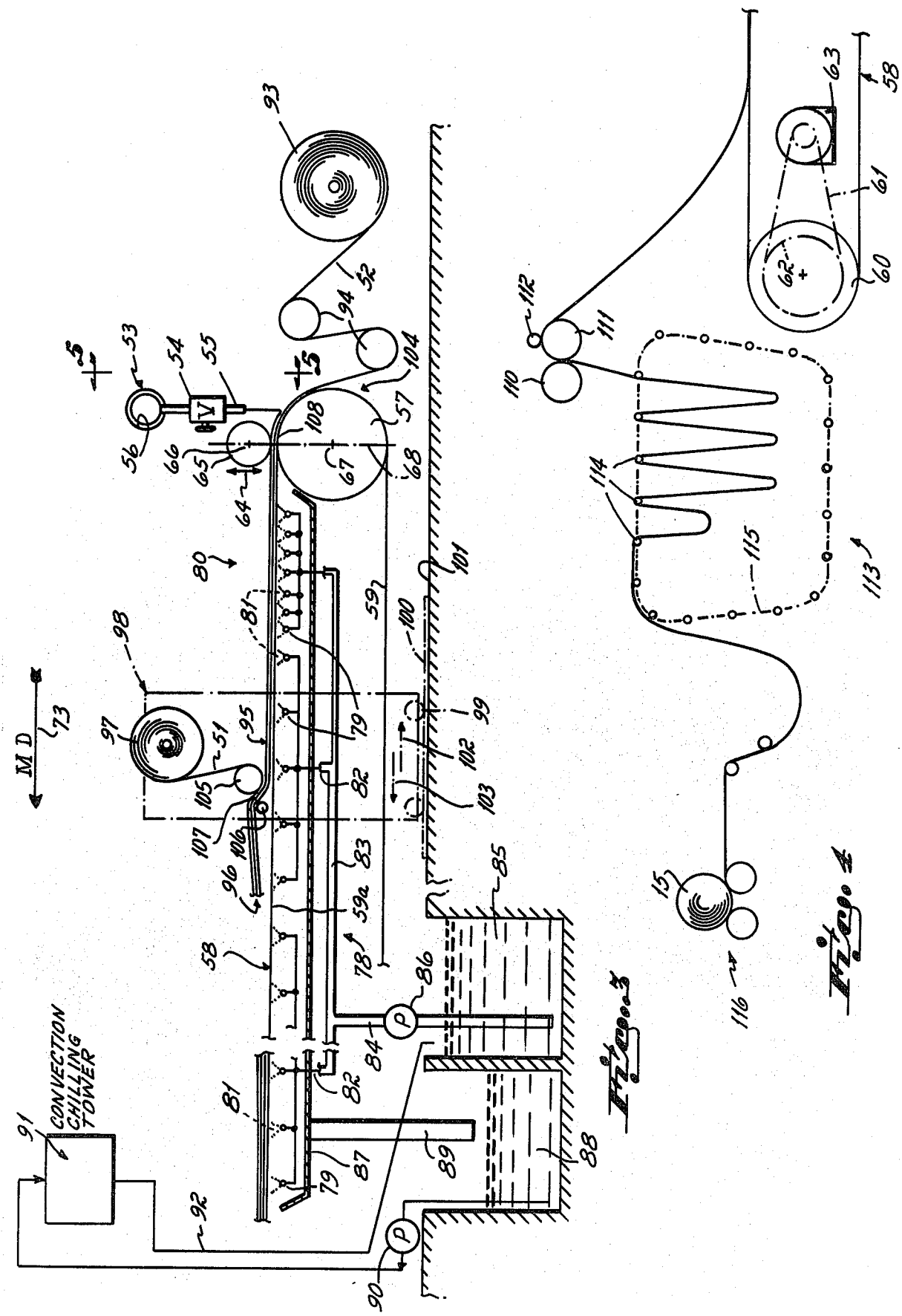

SYSTEM FOR PRODUCING A BITUMEN LAMINATE

This invention relates to lamination systems. More particularly, this invention relates to a lamination system for adhering two fabric webs to opposite sides of an bitumen mastic core.

A laminate comprised of a bitumen mastic core, and a synthetic fabric adhered to each side of that core, has at least a couple of different end uses. When the laminate is made of a bitumen mastic core with a non-woven polyester fabric laminated to each side of that core, when the laminate is relatively thin, e.g., on the order of 0.10 inch or so, and when the laminate is made in relatively wide sheet form, e.g., 36 inches or so, of an extended length, the sheet-like laminate is useful to the roofing industry for erecting multi-ply type flat roofs. A built-up flat roof may be installed with this laminate using hot roofing asphalt as the adhesive between a base ply of the laminate and the roof substrate, and between other plys laid up on the base ply, even though the hot asphalt's temperature is such that the non-woven polyester fabric would deteriorate if the hot asphalt was exposed to the fabric by itself. Also, when the laminate is made of a bitumen mastic core with a non-woven polypropylene fabric laminated to each side of that core, when the laminate is relatively thin, e.g., on the order of 0.10 inch or so, and when the laminate is made in relatively narrow sheet form, e.g., 20 inches or so, the sheet-like laminate is useful in the road re-surfacing industry to prevent reflection cracks in re-surfaced roadways. This latter laminate is laid down over cracks of any length in an old road surface, and a new asphalt layer then laid up over the old surface and over the laminate. The laminate prevents the cracks in the old road surface from reflecting through the new re-surfaced road layer.

But it has been found most difficult to laminate synthetic fabrics such as non-woven polyester fabric and non-woven polypropylene fabric to a bitumen mastic so as to provide commercial quantities of these bitumen mastic core products. This for the reason that when efforts are made by known methods to coat the hot or molten bitumen mastic onto the fabric, i.e., to adhere the fabric to the bitumen mastic core without use of separate adhesives, the temperature of the molten bitumen mastic during the coating process is such as to cause significant degradation of these synthetic fabrics. In other words, and because the temperature of the bitumen mastic when same is in a molten and therefore coatable condition is substantially higher than that temperature at which these synthetic fabrics will degrade or deteriorate, i.e., shrink, or lose strength, or indeed even melt, it is not possible to coat a hot bitumen mastic on these synthetic fabrics by known methods. Further, adherence of these synthetic fabrics to a pre-formed bitumen mastic core after same has been produced in sheet form, and after same has been cooled from the molten state, would not be possible without use of a separate or independent adhesive of some kind. Use of a separate adhesive would require additional system equipment and processing steps all of which, of course, would increase the cost of the end product.

Accordingly, it has been the objective of this invention to provide a lamination system by which a fabric web, and preferably a synthetic fabric web such as a polyester or polypropylene fabric web, can be adhered to a bitumen mastic core, on both the upper and lower faces of that core, where the mastic itself is used as the adhesive while the mastic is hot or molten, the system not resulting in degradation or deterioration of the fabric as a result of exposure of the fabric to the hot or molten mastic.

In accord with this objective, the lamination system of this invention is directed to a system for producing a relatively thin bitumen laminate comprised of a bitumen mastic core to which is adhered a fabric web on each side thereof, adherence being established simply by contacting the fabric web with the bitumen mastic while it is hot. The method includes continuous deposit at a fixed location of hot bitumen mastic to form the core on a moving lower fabric web, the laminated lower fabric web being in direct contact with a fluid cooled endless belt to prevent degradation of the fabric. The bitumen mastic is deposited on the lower web as it transverses the endless belt's upstream end roll, thereby insuring a firm, non-flexible surface upon which the mastic core can be sized by a doctor roll on the lower web. A moving top fabric web is laminated to the sized bitumen mastic core on the lower web at a location that is variable relative to the fixed location at which the mastic is deposited on the lower web. This variability of the upper fabric web's lamination point with the bitumen mastic core and lower web allows the system to be easily and simply modified for use with various synthetic fabrics, as well as with various thickness bitumen mastic cores, simply by adjusting the upper web's lamination point to that location which does not cause degradation of the upper fabric web due to the temperature of the mastic core.

Other objectives and advantages will be more apparent from the following detailed description taken in conjunction with the drawings in which:

FIG. 1 is a perspective view of an bitumen laminate produced in accord with the principles of this invention;

FIG. 2 is a diagrammatic view of the mixing steps in preparing a hot bitumen mastic in accord with the lamination system of this invention;

FIG. 3 is a diagrammatic view illustrating lamination of upper and lower synthetic fabric webs to the hot bitumen mastic;

FIG. 4 is a view similar to FIG. 3, but showing accumulation and wind-up of the laminate into a roll thereof, the entire method sequence proceeding from FIG. 2 through FIG. 3 through FIG. 4 in sequence in order to provide the product shown in FIG. 1;

FIG. 5 is an end view taken along line 5—5 of FIG. 3; and

FIG. 6 is a side view taken along line 6—6 of FIG. 5.

The bitumen laminate 10 that this laminate system is adapted to produce is illustrated in FIG. 1. This bitumen laminate 10 is comprised of a bitumen mastic core 11 and a synthetic fabric 12, 13 adhered to opposite side faces of that core, the product being produced in sheet form 14 of substantial width that can be rolled or coiled into roll 15 configuration for storage and/or shipment purposes. More particularly, the bitumen mastic core 11 is comprised of an asphalt and stone dust, and the upper and lower fabric 12, 13 webs that are adhered to the bitumen mastic are both non-woven polyester fabrics. The specifics of a suitable fabric 12, 13 and of a suitable bitumen mastic are more particularly disclosed in U.S. Pat. application Ser. No. 353,949, entitled "Roofing Laminate and Method", filed on the same date of this application, the disclosure in that application being incorporated herein by reference.

The bitumen mastic mixing steps that are part of the laminate system are illustrated particularly in FIG. 2. The mixing system includes a supply source 20 of hot asphalt, and a supply source 21 of stone dust. The stone dust is delivered to a vibratory hopper 22 by a screw type feed conveyor 23 driven by electric motor 24 and drive 25. The vibratory hopper 22, which includes movable 26 and fixed 27 sections, is vibrated by a vibrator device 28 connected to same. The vibrator device 28 includes eccentric vibrator 29 and motor drive 30. The vibratory hopper 22 supplies stone dust to an accurate vibratory feeder mechanism 33 through sleeve 34. The vibratory feeder mechanism 33, driven by motor 35 and variable speed drive 36, accurately feeds stone dust at atmospheric temperature into mixer 37 upon demand for same as controlled by an electric control circuit (not shown) that includes pressure sensitive switch 38. The hot asphalt from supply source 20, which is heated to a temperature between about 400° F. to 425° F., is fed to the mixer 37 by variable speed pump 39 through three way motor valve 41, the motor valve being also part of the control circuit (not shown) that includes the pressure sensitive switch 38. Asphalt is pumped continuously by pump 39 from asphalt source 20 to motor valve 41 and continuously returned to source via recycle piping 39A when the three way motor valve is actuated by pressure switch 38 to introduce asphalt to the mixer 37 on demand.

The mixer 37 itself is a sealed-to-outside atmosphere, multi-blade 40 mixer that functions on a continuous throughput basis, and the pressure sensitive switch 38 is connected to that mixer at fitting 42 in order to sense atmospheric pressure inside the mixer on a continuous basis. The mixer 37 is driven by an electric motor 49, the paddles 40 on the mixer being fixed to rotating shaft 50. The mixer 37 itself is heated through use of a hot oil jacket, also to a temperature of about 400° F. to 425° F. The stone dust and hot asphalt components are introduced into the mixer 37 at end port 45, and the bitumen mastic 44 is withdrawn from the mixer at opposite end port 46 by continuously operating variable speed mastic pump 47 in manifold pipe 48. The level 43 of asphaslt mastic 44 in the mixer 37 is maintained substantially constant through use of the pressure sensitive switch 38, same being sensitive to the atmospheric pressure within the mixer (which, as mentioned, is otherwise sealed to the mixer's exterior environment). When the pressure level within the mixer 37 falls beneath a lower preset level, additional bitumen mastic components, i.e., additional stone dust and hot asphalt, are fed to the mixer by turning on the stone dust feeder 33 and opening the motor valve 41, and when the atmospheric pressure within the mixer achieves an upper preset level, the stone dust feeder 33 is turned off and the motor valve 41 is closed. In this particular bitumen mastic mixing system, therefore, the use of pressure sensitive switch 38, which continuously senses the atmospheric pressure within the mixer 37, is a means for controlling the infeed of stone dust and hot asphalt to the mixer in order to provide a continuous output of admixed bitumen mastic 44 ready for lamination to the synthetic fabric 12, 13, and provides a unique and simple way of achieving that control end result.

The section of the system by which the molten bitumen mastic 44 is adhered or laminated to upper 51 and lower 52 synthetic fabric webs is shown primarily in FIG. 3, but also in FIGS. 5 and 6. The molten mastic 44 is pumped from the mixer 37 by pump 47 to a heated manifold 53 that feeds valve 54 controlled nozzles 55 located across the width of lower fabric web 52. The manifold 53, which is heated by a hot oil jacket 56 so as to maintain a molten mastic temperature of about 300° F. to 325° F., is positioned with nozzles 55 so that the nozzles are located over upstream end roll 57 of an extended length conveyor 58 that includes an endless liquid impermeable belt 59. The extended length conveyor 58 also includes downstream end roll 60 which functions as the conveyor's drive roll, the drive roll being driven by a chain 61 and sprocket 62 from electric motor 63. The conveyor belt 59 itself is preferably a stainless steel belt on the order of 0.040 inches thick, and is of a width W greater than the width W' of the fabric webs 51, 52 to which the molten bitumen mastic 44 will be laminated.

The molten mastic nozzles 55 cooperate with a heated doctor roll 65 and the conveyor's upstream end roll 57 in a novel way that allows the thickness or gauge of the mastic core 11 to be closely sized and controlled as desired, and that allows deposit of the molten mastic on the lower fabric web 52 to be controlled easily by an operator simply by increasing or decreasing the conveyor belt 59 speed at a given mastic 44 flow throughout as provided by pump 47. Specifically, and as shown in FIGS. 5 and 6, the heated doctor roll 65, which is a non-driven roll and which is normally retained in place against rotation, is positioned relative to the conveyor's upstream end roll 57 so that the centers 66, 67 of both rolls are in a vertical plane 68, the doctor roll preferably being of a diameter less than about one-half the diameter of the end roll 57. This, of course, locates the nearest points 69, 70 of the rotatable end roll 57 and the non-driven doctor roll 65 one right above the other, the doctor roll thereby having a vertically immobile surface 70 with which to cooperate since the end roll 57 is vertically and horizontally fixed in a conveyor frame, not shown. This doctor roll 65/end roll 57 relationship insures accurate metering of the molten mastic 44 deposited on the lower fabric web 52 for establishing an even core 11 thickness on that web. The heated doctor roll 65 is vertically adjustable, as shown by arrows 64, by virtue of bolts 71 threadedly connected to a fixed frame members 72 as shown in FIG. 5 for adjusting the gap between the doctor and end 57 rolls in order to change the thickness of the mastic core 11 when desired by the operator.

The molten mastic nozzles 55, as shown in FIGS. 5 and 6, are oriented in a line transverse to the machine direction 73 of the lamination system, and are located just upstream of the heated doctor roll 65. The nozzles 55 are positioned so that, when the doctor roll 65 and the conveyor's end roll 57 are viewed in end view as shown in FIG. 6, the nozzles will deposit hot mastic 44 on the lower fabric web 52 as the web traverses that end roll in the idler roll's top upstream quadrant 74. Preferably, the molten asphalt mastic 44 will be deposited on the lower fabric web 52 on the conveyor's end roll 57 very closely adjacent to the doctor roll 65, the heated doctor roll itself vertically positioned relative to that end roll 57 so as to define the thickness of the molten mastic core 11 desired. The pool 75 of molten mastic 44 on the lower web 52 can be easily controlled by an operator, when the flow of mastic through nozzles 55 is constant, simply by visually observing the pool of mastic on the web 52 upstream of the doctor roll 65, and thereafter adjusting the machine direction 73 speed of the conveyor belt 59 or changing pump 39 speed. Also, the position of the doctor roll 65, nozzles 55 and conveyor's upstream end roll 57 insures that the thickness T of the mastic core 11 will be quite constant across the width and length of the laminate 10 being produced. If the doctor roll 65 were located downstream of its position as shown, periodic downward flexure of the conveyor belt 59 would tend to provide mastic cores of unreliable or variable thickness throughout the length of laminate 10 being produced. The width W" of the mastic core 11 deposited on the lower fabric web 52 is defined by adjustable width guides 76 both of which are heated by hot oil flow 77 therethrough to prevent the molten mastic from sticking thereto.

The conveyor 58 itself, as previously mentioned, includes upstream end idler roll 57 and downstream end drive roll 60 which carry the wide stainless steel sheet like endless belt 59. A cooling system 78 is disposed beneath the top run 59a of the conveyor belt as shown in FIG. 3. This cooling system 78 includes a series of elongated water spray heads 79 positioned transverse to the machine direction 73 underneath the top conveyor run 59a. Each of the spray heads 79 is provided with outlets for directing water spray 81 against the underneath side of the conveyor belt's top run across the entire width W thereof. Each of the spray heads 79 is connected through a section feed pipe 82 to a main feed pipe 83, and the main feed pipe is connected by source pipe 84 to a cool water reservoir 85. The spray heads 79 continuously direct the water spray 81 against the underside of the conveyor belt's top run 59a as the cool water from cool water reservoir 85 is pumped to the spray heads 79 by pump 86, thereby providing a cooling or chilling effect to the stainless steel belt 59. Of course, because the stainless steel belt is a non-porous web having a high heat transfer coefficient, water never comes in contact with the laminate 10 product being formed on top of the belt's top run 59a but the water's cooling effect is directly and efficiently transferred through the belt to the lower fabric web 52. Note the extended length water spray heads 79 are positioned more closely together relative one to the other adjacent to the end roll 57 of the conveyor, i.e., adjacent to the molten mastic nozzles 55, than is the case downstream therefrom. This is desirable to provide maximum cooling of the belt 59, and therefore of the lower fabric web 52, just downstream of mastic pool 75.

The water cooling system 78 also includes a drain pan 87 located underneath the elongated spray heads 79. The drain pan 87, of course, functions to collect the sprayed cooling water, and direct same to warm water tank 88 through drain pipe 89 connected to the drain pan. The warm water in tank 88 is pumped by pump 90 to a convection chilling tower 91 where it is recooled, preferably to about 60° F.–90° F. depending on the ambient temperature. The water chilled by the convection chilling tower 91 is then allowed to drain by gravity through return pipe 92 to the cool water tank 85. The water cooling system 78 associated with the conveyor 58, therefore, is a closed system that does not continuously require fresh water. Further, the cool water 85 and warm water 88 storage tanks can both be located immediately beneath the conveyor 58 itself, thereby optimizing the space efficiency for the lamination system.

The lower fabric web 52 is supplied from a non-driven supply roll 93, the lower fabric web being withdrawn from that supply roll and wound over tension rolls 94, 94 prior to being introduced as the bottom fabric layer 13 of the laminate 10 product on the conveyor belt 59. Contact of the bottom fabric web 52 with the conveyor belt 59 occurs, as shown in FIGS. 3 and 6, at a location upstream of where the molten mastic pool 75 is fed onto the web 52 by the nozzles 55. Thus, and in effect, the molten mastic 44 is pooled onto the lower fabric web 52 while the fabric is in contact with the conveyor belt 59. The mass of the end roll 57 in combination with the chilled belt 59 provides a heat sink effect which provides a relatively cool surface to support the fabric web 52 section beneath the mastic pool 75. Further, and immediately after the molten mastic 44 is pooled on the web and same has been sized by doctor roll 65, the conveyor belt 59 is cooled directly once again because of nozzles 79 spraying water 81 against the underside of the belt. The concentrated cooling spray section 80 of the conveyor 58 withdraws significant heat from the molten mastic core 11 and, in effect, translates it from a flowable molten state into a non-flowable but still hot state. Of course, the molten mastic core 11 is adhered or laminated to the bottom fabric web 52 at this point. But the important feature of the water spray 81 on the underside of the conveyor belt's top run 59a is that same withdraws the heat so very quickly from the molten mastic that the heat of the mastic does not adversely affect the synthetic fabric 13 of web 52, e.g., the 300° F.–325° F. molten asphalt mastic does not adversely affect a non-woven polyester fabric when eposited thereon. A further advantage of the water cooled conveyor belt 59 system is that the conveyor belt provides significant support for the partially formed laminate 95, i.e., the molten mastic core 11 and bottom fabric web 52, as well as for the finally formed three layer laminate 96, i.e., the mastic core 11 and the top 51 and bottom 52 fabric webs, so that it is the conveyor belt 59 itself that conveys the partially and fully formed laminate in the machine direction 73. In other words, substantially no machine direction pulling forces are induced into the top or bottom fabric layers webs 51, 52 when same are exposed to flowable hot asphalt mastic from nozzles 55, and this is important because any pulling forces so induced on those webs would tend to reduce the strength of the final asphalt laminate 10 product.

A supply roll 97 of the top fabric web 51 is rotatably carried on a movable gantry 98 positioned over the conveyor 59. The frame of the gantry 98, which is shown schematically in FIG. 3, includes wheels 99 that ride on rails 100 mounted to floor 101 beneath the conveyor 58. Thus, the gantry 98, and therefore the supply roll 97 of top fabric web 51, is movable parallel to the machine direction 73, both toward (phantom arrow 102) and away from (phantom arrow 103) the upstream end 104 of the conveyor 58. The top fabric web 51 is withdrawn from the top supply roll 97 and trained over tension roll 105, the tension roll cooperating with a kiss roll 106 spaced slightly downstream therefrom. The tension 105 and kiss 106 rolls are also rotatably mounted to the gantry 98 frame, and these rolls function as adhering means in the form of lamination rolls. In the gantry 98 area of the conveyor 58, the preliminary laminate 95, i.e., the mastic core 11 and lower fabric web 52 adhered thereto, are adhered to the top fabric web 51 to form the final laminate 10 product. The bitumen mastic core 11 on the preliminary laminate 95 is still hot, although no longer in spreadable liquid form, when it reaches the gantry 98 area of the conveyor. Thus, as the top fabric web 51 is pressed against the mastic core 11 by the tension roll 105 and kiss roll 106 (the preliminary laminate 95 being passed between those rolls), the top fabric web 51 is adhered to the mastic core 11 because the mastic core acts as its own adhesive.

Importantly relative to the lamination system of this invention, the location of the gantry 98 relative to the upstream end 104 of the conveyor 58, as adjusted by moving the gantry 98 frame on adjustment means that include the gantry's wheels 99 and floor rails 100, allows adjustment of the lamination point 107 of the top fabric web 51 to the preliminary laminate 95 in either upstream or downstream directions. This is important because it is necessary that the lamination point 107 of the top fabric web 51 with the preliminary laminate 95 be at a point in the process where the temperature of the mastic core 11 is such that good adherence of the fabric web 51 to the mastic core 11 is achieved, but also is not hot enough to degrade that upper fabric web as it is adhered to the mastic core, during production of the final laminate 10. In other words, and since the upper fabric web 51 is not directly cooled adjacent its lamination point 107 as is the lower fabric web 52 adjacent its lamination point 108, adjusting the lamination point 107 upstream or downstream provides a practical and easy way to insure the temperature of the mastic core 11 is not too hot when the top web is adhered thereto during production of the final laminate 10.

Generally speaking, and in practice, holding means in the form of the gantry 98 frame, as shown in FIG. 3, acts to hold the point 107 of lamination for the top web 51 constant at a constant machine speed for a final laminate 10 product having a set thickness T. However, the lamination point 107 may have to be moved if machine speed is increased or decreased. For example, the faster the machine speed, the hotter the bitumen mastic stays until it is laminated, and therefore the farther downstream the lamination point 107 will have to be positioned. The converse is true if the machine speed is decreased. If the thickness T of the mastic core 11 of the final laminate is significantly increased, then the mastic core 11 will retain its heat longer and the desired lamination point 107 should be moved downstream 103 relative to the asphalt mastic nozzles 55. Such is accomplished, as mentioned, simply by moving the gantry 98 frame downstream in direction 103 on gantry rails 100, thereby moving the upper web supply roll 97, and the tension 105 and kiss 106 rolls associated therewith, downstream, too. Conversely, and if the thickness T of the mastic core 11 is reduced, then the desired lamination point 107 of the top fabric web 51 to the preliminary lamination produce 95 may be upstream closer to the mastic nozzles 55. And in this case, of course, the gantry 98 frame is simply moved upstream 102 on the rails 100 so that the lamination point 107 of the top fabric web 51 to the preliminary product 95 can be located as required in order to achieve the desired adherence of the top fabric web to the mastic core. But the point here is that the top fabric web gantry 98, being movable 102, 103 in a direction parallel to the machine direction relative to the conveyor's upstream end 104, allows the lamination point 107 of the top fabric web 51 to be moved upstream or downstream relative to the lamination point 108 of the bottom fabric web 52 with the molten mastic 44, thereby making that top fabric web's lamination point 107 adjustable to an optimum position at which it is thereafter held during production of the final laminate 10 so that minimum damage occurs to the top fabric web (due to potential over-exposure to heat in the bitumen mastic 44) while obtaining optimum adherence of the upper web 51 to the molten mastic core.

Movement of the gantry 98 from one position to another also may be required when one type of synthetic fabric is substituted for another type of synthetic fabric in the laminate 10. This is particularly the case when the temperature at which one synthetic fabric will degrade is significantly different than the temperature at which another synthetic fabric will degrade. When a laminate 10 is being produced by this system with a set thickness, and when a fabric with a lower degradation temperature is substituted for a fabric with a higher degradation temperature, the lamination point 107 should be moved downstream in direction 103 relative to the conveyor's upstream end 104 so as to provide time for additional heat to be withdrawn from preliminary laminate 95 by cooling system 78. Conversely, and when a higher degradation temperature fabric is substituted for a lower degradation temperature fabric, it may be desirable to move the gantry 98 for upper web 51 upstream in direction 102 so as to move lamination point 107 for the upper web closer to lamination point 108 for the lower web 52.

After the three layer laminate has been produced, i.e., after the top fabric web 51 has been adhered to the preliminary laminate 95 to form the final laminate 96, the final laminate product 10 is cooled further by additional exposure to the water cooled conveyor belt 59. Such added cooling continues until asphalt mastic core 11 is in a stable condition relative to the top 51 and bottom 52 fabric webs. Subsequently, and as shown in FIG. 4, the three layer endless laminate is withdrawn from the conveyor 58 by driven take-off roll 110 and idler take-off roll 111. The take-off rolls 110, 111 cooperate with a sizing roll 112 that is adjustably positionable relative to take-off roll 111 so as to establish final sizing, i.e., final thickness, of the three layer laminate 96. The take-off rolls 110, 111 cooperate with an accumulator section 113 having a series of accumulator bars 114 mounted on a conveyor chain 115 in known fashion. The accumulator section 113 feeds a take-up section 116 in order to wind up or coil the laminate 10 in reels or rolls 15 for shipping or storage purposes. The accumulator 113 and take-up sections 116 are known to the art, and form no part of the invention per se herein.

Having described in detail the preferred embodiment of my invention, what I desire to claim and protect by Letters Patent is:

1. A method for producing a laminate with a bitumen mastic core, said method comprising the steps of conveying in a machine direction a preliminary laminate comprised of a lower fabric web with a hot bitumen mastic core deposited thereon, adhering an upper fabric web to said preliminary laminate on the exposed face of said hot bitumen mastic core at a lamination point, adjusting said lamination point upstream or downstream relative to said machine direction as desired in order to adhere said upper fabric web to said core face without substantial deterioration of said upper fabric web as might otherwise be caused by the temperature of said hot bitumen mastic core at said lamination point, and holding said lamination point in a fixed location relative to said machine direction of said preliminary laminate during the production of said laminate, said holding step being performed after said adjusting step has adjusted said lamination point to its desired position.

2. A method as set forth in claim 1, said method comprising the step of
cooling said preliminary laminate prior to said lamination point.

3. A method as set forth in claim 2, said method comprising the steps of
pooling a supply of hot bitumen mastic on said lower fabric web, and
sizing said bitumen mastic to a desired core thickness on said lower fabric web to form said preliminary laminate prior to adhering said upper fabric web to said bitumen mastic core.

4. A method as set forth in claim 3, said preliminary laminate being conveyed on a liquid impervious conveyor belt, and the underside of the conveying run of said conveyor belt being cooled by spraying a liquid thereagainst.

5. A method as set forth in claim 1, said method comprising the step of
passing said preliminary laminate and said upper fabric web through a pair of lamination rolls that cooperate to define said lamination point, said rolls being movable upstream and downstream relative to said machine direction during said adjusting step, but said rolls being held in position against upstream and downstream movement during said holding step.

6. A method as set forth in claim 5, said method comprising the steps of
carrying a supply roll of upper web fabric on a movable frame, said lamination rolls also being carried on said movable frame, and
moving said frame upstream or downstream relative to said machine direction, during said adjusting step.

7. A method as set forth in claim 1, the machine direction position of said lamination point being selected depending on the thickness of said bitumen mastic core and the type of fabric being adhered thereto relative to the temperature of said bitumen mastic at said lamination point.

8. Apparatus for producing a laminate with a bitumen mastic core, said apparatus comprising
a conveyor for conveying, in a machine direction, a preliminary laminate comprised of a lower fabric web with a hot bitumen mastic core deposited thereon,
means for adhering an upper fabric web to said preliminary laminate on the exposed face of said bitumen mastic core at a lamination point,
means for adjusting said lamination point upstream or downstream relative to said machine direction as desired in order to adhere said upper fabric web to said core face without substantial deterioration of said upper fabric web as might otherwise be caused by the temperature of said hot bitumen mastic core at said lamination point, and
means for holding said lamination point in a fixed position relative to said machine direction of said preliminary laminate during the production of said laminate, said holding means being operational after said adjusting means has adjusted said lamination point to its desired position.

9. Apparatus as set forth in claim 8, said apparatus comprising
a cooling system for cooling said preliminary laminate prior to said lamination point.

10. Apparatus as set forth in claim 9, said apparatus comprising
nozzle means for pooling a supply of hot bitumen mastic on said lower fabric web, and
sizing means for sizing said bitumen mastic to a desired core thickness on said lower fabric web to form said preliminary laminate prior to adhering said upper fabric web to said bitumen mastic core.

11. Apparatus as set forth in claim 9, said conveyor comprising
a liquid impervious conveyor belt, the underside of the conveying run of said conveyor belt being cooled by spraying a liquid thereagainst through use of said cooling system.

12. Apparatus as set forth in claim 8, said apparatus comprising
a pair of lamination rolls through which said preliminary laminate and said upper fabric web are passed, said rolls cooperating to define said lamination point, said rolls being movable upstream and downstream relative to said machine direction by said adjusting means, but said rolls being held in position against upstream and downstream movement by said holding means.

13. Apparatus as set forth in claim 12, said apparatus comprising
a movable frame on which a supply roll of upper web fabric is carried, said lamination rolls also being carried on said movble frame, and
means for moving said frame upstream or downstream relative to said machine direction during adjustment of said lamination point.

14. Apparatus as set forth in claim 13, said frame comprising
a gantry movable along rails disposed parallel to the machine direction of said apparatus.

15. Apparatus as set forth in claim 8, the machine direction position of said lamination point being selectable depending on the thickness of said bitumen mastic core and the type of fabric being adhered thereto relative to the temperature of said bitumen mastic at said lamination point.

* * * * *